US010682677B2

(12) United States Patent
Sen et al.

(10) Patent No.: US 10,682,677 B2
(45) Date of Patent: Jun. 16, 2020

(54) SYSTEM AND METHOD PROVIDING SITUATIONAL AWARENESS FOR AUTONOMOUS ASSET INSPECTION ROBOT MONITOR

(71) Applicant: General Electric Company, Schenectady, NY (US)

(72) Inventors: Shiraj Sen, Niskayuna, NY (US); Steven Gray, Niskayuna, NY (US); Nicholas Abate, Saratoga Spring, NY (US); Roberto Silva Filho, San Ramon, CA (US); Ching-Ling Huang, San Ramon, CA (US); Mauricio Castillo-Effen, Niskayuna, NY (US); Ghulam Ali Baloch, Niskayuna, NY (US); Raju Venkataramana, San Ramon, CA (US); Douglas Forman, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 354 days.

(21) Appl. No.: 15/591,851

(22) Filed: May 10, 2017

(65) Prior Publication Data

US 2018/0330027 A1    Nov. 15, 2018

(51) Int. Cl.
| | |
|---|---|
| *B08B 13/00* | (2006.01) |
| *B64C 39/02* | (2006.01) |
| *B25J 5/00* | (2006.01) |

(52) U.S. Cl.
CPC .............. *B08B 13/00* (2013.01); *B25J 5/007* (2013.01); *B64C 39/024* (2013.01)

(58) Field of Classification Search
CPC ....... G05D 1/0094; B25J 9/1653; B25J 5/007; B64C 39/024; B61L 25/023; G01B 11/25; H04B 10/25752; F17D 5/00; G01M 5/006
See application file for complete search history.

(56) References Cited

U.S. PATENT DOCUMENTS

| | | | |
|---|---|---|---|
| 6,243,483 B1 * | 6/2001 | Petrou | ...................... F17D 5/00 348/144 |
| 7,933,667 B2 | 4/2011 | Sjöberg et al. | |

(Continued)

FOREIGN PATENT DOCUMENTS

WO    2016140985 A1    9/2016

OTHER PUBLICATIONS

Balaguer, C. et al., "A climbing autonomous robot for inspection applications in 3D complex environments", Robotica, vol. 18, Issue: 3, May 1, 2000, (pp. 287-297, 11 total pages).

(Continued)

*Primary Examiner* — Kandasamy Thangavelu
(74) *Attorney, Agent, or Firm* — Fletcher Yoder, P.C.

(57) ABSTRACT

A three-dimensional model data store may contain a three-dimensional model of an industrial asset, including points of interest associated with the industrial asset. An inspection plan data store may contain an inspection plan for the industrial asset, including a path of movement for an autonomous inspection robot. An industrial asset inspection platform may receive sensor data from an autonomous inspection robot indicating characteristics of the industrial asset and determine a current location of the autonomous inspection robot along the path of movement in the inspection plan along with current context information. A forward simulation of movement for the autonomous inspection robot may be executed from the current location, through a pre-determined time window, to determine a difference between the path of movement in the inspection plan and the forward simulation of movement along with future context information.

25 Claims, 9 Drawing Sheets

(56) References Cited

U.S. PATENT DOCUMENTS

| | | | |
|---|---|---|---|
| 8,090,475 | B2 | 1/2012 | Blanc et al. |
| 8,505,461 | B2 | 8/2013 | Phillips et al. |
| 8,818,572 | B1 | 8/2014 | Tofte et al. |
| 9,104,202 | B2 | 8/2015 | Pack et al. |
| 9,129,355 | B1 | 9/2015 | Harvey et al. |
| 9,446,515 | B1 | 9/2016 | Meier |
| 9,618,940 | B1 | 4/2017 | Michini et al. |
| 10,243,784 | B2* | 3/2019 | Gerszberg ........ H04B 10/25752 |
| 2008/0024594 | A1 | 1/2008 | Ritchey |
| 2008/0140321 | A1 | 6/2008 | Blanc et al. |
| 2013/0261876 | A1* | 10/2013 | Froom ................ G01M 5/0016 701/29.3 |
| 2014/0135983 | A1* | 5/2014 | Donar .................... B25J 9/1653 700/254 |
| 2015/0012171 | A1* | 1/2015 | Richter .................. G06T 7/001 701/32.9 |
| 2016/0264262 | A1* | 9/2016 | Colin ....................... B25J 5/007 |
| 2016/0268823 | A1* | 9/2016 | Gonzalez ............ G05D 1/0225 |
| 2016/0313736 | A1 | 10/2016 | Schultz et al. |
| 2018/0033320 | A1* | 2/2018 | Castelli .................... B64F 5/60 |
| 2018/0036890 | A1* | 2/2018 | Hollister ................ G01B 11/25 |
| 2018/0151045 | A1* | 5/2018 | Kim ....................... B64C 39/024 |
| 2018/0170414 | A1* | 6/2018 | Arndt .................... B61L 25/023 |
| 2018/0170540 | A1* | 6/2018 | Claybrough ......... G05D 1/0094 |
| 2018/0273173 | A1* | 9/2018 | Moura ................. G05D 1/0094 |

OTHER PUBLICATIONS

Purohit, Aveek et al., "SugarMap: Location-less Coverage for Micro-Aerial Sensing Swarms", Information Processing in Sensor Networks, Apr. 8-11, 2013, Philadelphia, PA, 12 pages.

Bircher, Andreas et al., "Structural Inspection Planning via Iterative Viewpoint Resampling with Application to Aerial Robotics", International Conference on Robotics and Automation, 2015, 8 pages.

J. K. Oh et al., "Design and Control of Bridge Inspection Robot System", 2007 International Conference on Mechatronics and Automation, Aug. 5-8, 2007, Harbin, China, (pp. 3634-3639, 6 total pages).

International Search Report issued in connection with corresponding PCT Application No. PCT/US2018/30547 dated Aug. 20, 2018.

* cited by examiner

SYSTEM AND METHOD PROVIDING SITUATIONAL AWARENESS FOR AUTONOMOUS ASSET INSPECTION ROBOT MONITOR

BACKGROUND

The subject matter disclosed herein relates to industrial asset management, and more particularly, to monitoring and managing the health of an industrial asset using one or more autonomous robotic inspection systems.

Various entities may own or maintain various types of industrial assets as part of their operation. Such assets may include physical or mechanical devices or structures, which may, in some instances, utilize electrical and/or chemical technologies. Such assets may be used or maintained for a variety of purposes and may be characterized as capital infrastructure, inventory, or by other nomenclature depending on the context. For example, industrial assets may include distributed assets, such as a pipeline or an electrical grid, as well as individual or discrete assets, such as a wind turbine, airplane, a flare stack, vehicle, etc. Assets may be subject to various types of defects (e.g., spontaneous mechanical defects, electrical defects, or routine wear-and-tear) that may impact operation. For example, over time, an industrial asset may undergo corrosion or cracking due to weather or may exhibit deteriorating performance or efficiency due to the wear or failure of one or more component parts.

In some cases, a human inspector may inspect and analyze an industrial asset. For example, an inspector may look for and locate corrosion on the surface of an asset. However, depending on the location, size, and/or complexity of the asset and the surrounding environment, having one or more humans manually perform the inspection may take a substantial amount of time. Additionally, some inspection tasks may be boring, dirty, or otherwise unsuitable for a human. For example, some assets may have locations that are not easily accessible by humans due to height, confined spaces, danger, or the like.

To address these issues, one or more asset inspection robots equipped with sensors might be used to inspect an industrial asset. For example, a drone might be configured to fly in the proximity of an industrial flare stack taking pictures of various points of interest. Often, this will require one human operator to safely and effectively pilot the drone and another human operator to operate a sensor (e.g., a camera) to collect information about the asset. In another approach, an autonomous (or semi-autonomous) drone might follow a pre-determined flight path and/or make on-the-fly navigation decisions to collect data as appropriate. In some cases, however, it may be desirable to have a human monitor operation of an inspection robot (in case the robot runs into something it cannot handle itself, or the robot or inspection plan includes mistakes resulting in improper operation, etc.). Note that having a human review and/or monitor aspects of an inspection process can be a difficult and error-prone task. This can be especially true when a planned inspection will take a substantial amount of time, the inspection can potentially take various routes, there are many points of interest to be examined, the asset and/or surrounding environment are complex and dynamically changing, other people and/or robots are simultaneously operating in the area, etc.

It would therefore be desirable to provide systems and methods to facilitate situational awareness for an autonomous asset inspection robot monitor accurately and efficiently.

SUMMARY

According to some embodiments, a three-dimensional model data store may contain a three-dimensional model of an industrial asset, including points of interest associated with the industrial asset. An inspection plan data store may contain an inspection plan for the industrial asset, including a path of movement for an autonomous inspection robot. An industrial asset inspection platform may receive sensor data from an autonomous inspection robot indicating characteristics of the industrial asset and determine a current location of the autonomous inspection robot along the path of movement in the inspection plan along with current context information. A forward simulation of movement for the autonomous inspection robot may be executed from the current location, through a pre-determined time window, to determine a difference between the path of movement in the inspection plan and the forward simulation of movement along with future context information. In some embodiments, the platform may then visually provide results of said forward simulation to a human inspection monitor via an interactive display along with the sensor data, indications of the points of interest, and a representation of the three-dimensional model. Moreover, in some embodiments at least one of the current context information and the future context information includes a sensor projection onto the three-dimensional model of the industrial asset, an estimated remaining battery life, an estimated time of arrival at a point of interest, a data link strength, storage media operational status, a number of available satellites, a strength of a Differential Global Positioning System ("DGPS") base station link, etc. In some embodiments, the system may automatically generate and transmit an alarm to a human monitor based on at least one of the current context information and the future context information.

Some embodiments comprise: means for receiving, by a computer processor of an industrial asset inspection platform, sensor data from an autonomous inspection robot indicating one or more characteristics of the industrial asset; means for accessing an inspection plan data store containing electronic records comprising an inspection plan for the industrial asset, the inspection plan including a path of movement for an autonomous inspection robot; means for determining a current location of the autonomous inspection robot along the path of movement in the inspection plan along with current context information; means for executing a forward simulation of movement for the autonomous inspection robot from the current location, through a pre-determined time window, to determine a difference between the path of movement in the inspection plan and the forward simulation of movement along with future context information; and means for accessing a three-dimensional model data store containing electronic records comprising a three-dimensional model of the industrial asset, the three-dimensional model including a plurality of points of interest associated with the industrial asset.

Technical advantages of some embodiments disclosed herein include improved systems and methods to facilitate situational awareness for an autonomous asset inspection robot monitor accurately and efficiently.

DETAILED DESCRIPTION

Figure 1:
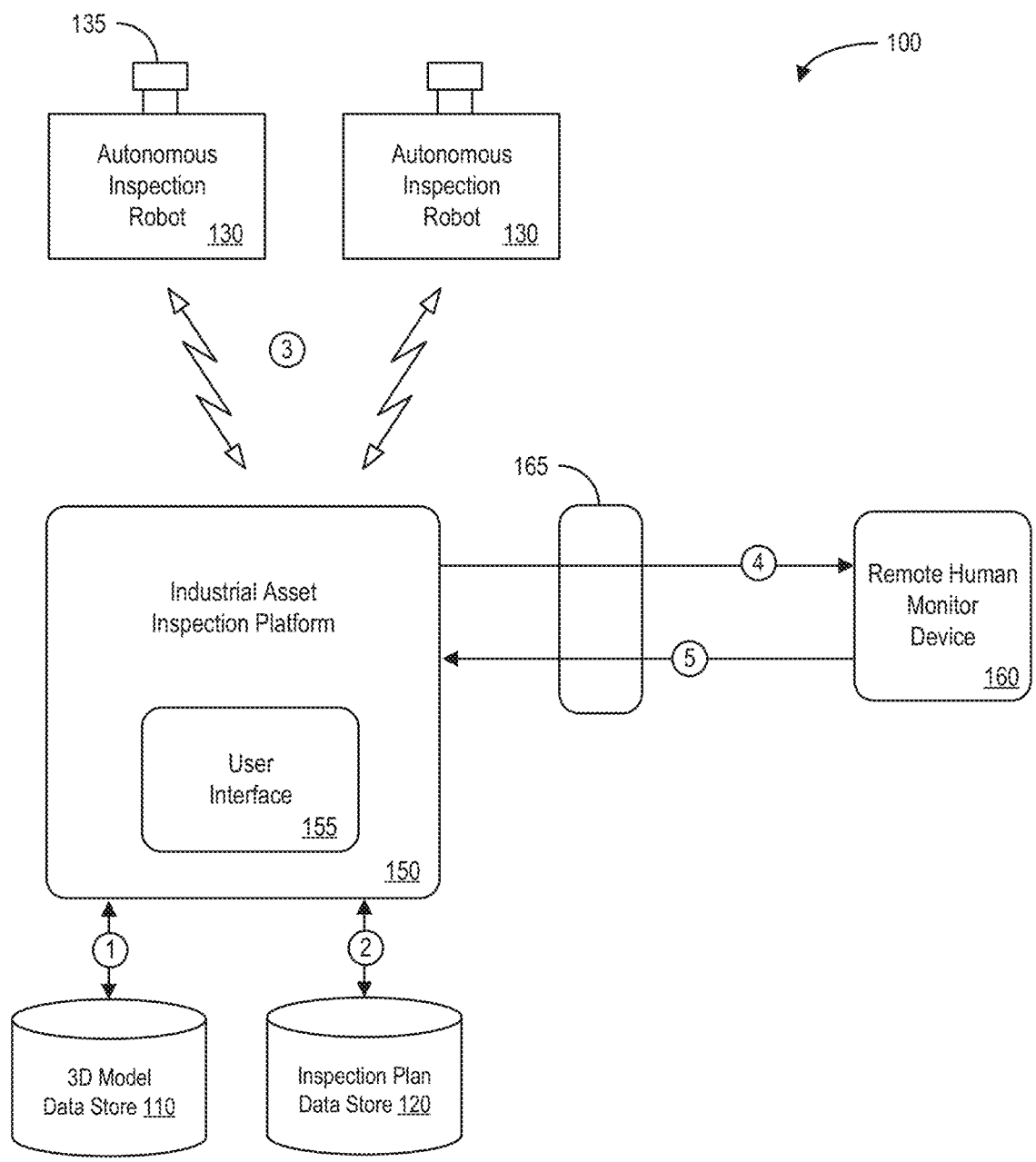
FIG. 1 is a high-level block diagram of an asset inspection system in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Some embodiments described herein relate to providing situational awareness for an autonomous asset inspection robot monitor. Such embodiments may be useful when inspecting industrial assets associated with various entities, including business or corporate entities, governments, individuals, non-profit organizations, and so forth. As discussed herein, such assets may be generally discrete or limited in their extent (e.g., a vehicle such as a plane, helicopter, ship, submersible, space launch vehicle, satellite, locomotive, and so forth) or may be geographically distributed (e.g., a road or rail track, a port or airport, a pipeline or electrical infrastructure, a power generation facility or manufacturing plant, and so forth). Some embodiments described herein may be used to inspect assets of these types (as well as others not listed) in an autonomous or semi-autonomous manner using robotic intermediaries.

With this in mind, it will be appreciated that in a variety of fields, assets, such as distributed assets and/or individual assets, may be used to perform any number of operations. Over time, assets may deteriorate due to weather, physical wear, or the like. For example, over months or years, one or more components of an asset may wear or deteriorate due to rain and wind or other environmental conditions or due to inadequate maintenance. Alternatively, in some instances, spontaneous failures of one or more components or systems of an asset may occur which may be unrelated to wear or maintenance conditions but may instead be attributable to an undetected defect or an unknown stressor. Regardless of whether an asset defect is due to gradual process or a sudden occurrence, understanding the health of the asset depends on inspecting for such defects in a timely and effective manner.

In some conventional approaches, one or more human agents (e.g., field engineers, operators, or other users of the asset) may inspect the asset for wear at limited intervals to determine the health of the asset. However, human agents may be unable to inspect components or locations that may not be easily accessible to humans, such as below the waterline of a marine asset, within a tank or pipe of a pipeline or storage facility, on the exterior surfaces or components of a vehicle in motion (such as a flying plane or helicopter, a moving truck or locomotive, and so forth).

To address these issues, one or more asset inspection robots equipped with sensors might be used to inspect an industrial asset. For example, a drone might be configured to fly in the proximity of an industrial flare stack taking pictures of various points of interest. Often, this will require one human operator to safely and effectively pilot the drone and another human operator to operate a sensor (e.g., a camera) to collect information about the asset. In another approach, an autonomous (or semi-autonomous) drone might follow a pre-determined flight path and/or make on-the-fly navigation decisions to collect data as appropriate. In some cases, however, it may be desirable to have a human monitor operation of an inspection robot (in case the robot runs into something it cannot handle itself, or the robot or inspection plan includes mistakes resulting in improper operation, etc.) Note that having a human review and/or monitor aspects of an inspection process can be a difficult and error-prone task. This can be especially true when a planned inspection will take a substantial amount of time, the inspection can potentially take various routes, there are many points of interest to be examined, the asset and/or surrounding environment are complex and dynamically changing, other people and/or robots are simultaneously operating in the area, etc.

It would therefore be desirable to provide systems and methods to facilitate situational awareness for an autonomous asset inspection robot monitor accurately and efficiently. FIG. 1 is a high-level block diagram of a system 100 according to some embodiments of the present invention. In particular, the system 100 includes an industrial asset inspection platform 150 that may access information in a three-dimensional model data store 110 (e.g., storing a set of electronic records defining a three-dimensional model of an industrial asset including a plurality of points of interest) and an inspection plan data store 120 (e.g., storing a set of electronic records defining an inspection plan including a path of movement for an autonomous inspection robot 130). The industrial asset inspection platform 150 may also exchange information with remote human monitor devices 160 (e.g., via a firewall 165). According to some embodiments, a user interface 155 of the industrial asset inspection platform 150 may communicate with the front-end user devices 160, access information in the three-dimensional model data store 110 and/or the inspection plan data store 120, and facilitate the presentation of interactive user interface displays to a human monitor. Note that the industrial asset inspection platform 150 might also be associated with a third party, such as a vendor that performs a service for an enterprise.

The industrial asset inspection platform 150 might be, for example, associated with a Personal Computer ("PC"), laptop computer, smartphone, an enterprise server, a server farm, and/or a database or similar storage devices. According to some embodiments, an "automated" industrial asset inspection platform 150 may automatically facilitate the presentation of interactive user interface displays. As used herein, the term "automated" may refer to, for example, actions that can be performed with little (or no) intervention by a human.

As used herein, devices, including those associated with the industrial asset inspection platform 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The industrial asset inspection platform 150 may store information into and/or retrieve information from the three-dimensional model data store 110 and/or the inspection plan data store 120. The three-dimensional model data store 110 and/or the inspection plan data store 120 may contain data that was downloaded, that was originally input by an operator of an enterprise, that was generated by the industrial asset inspection platform 150, etc. The three-dimensional model data store 110 and/or the inspection plan data store 120 may be locally stored or reside remote from the industrial asset inspection platform 150. As will be described further below, the three-dimensional model data store 110 and/or the inspection plan data store 120 may be used by the industrial asset inspection platform 150 to provide situational awareness for an autonomous asset inspection robot 130 monitor (e.g., a human). Although a single industrial asset inspection platform 150 is shown in FIG. 1, any number of such devices may be included. Moreover, various devices described herein might be combined according to embodiments of the present invention. For example, in some embodiments, the industrial asset inspection platform 150, three-dimensional model data store 110 and/or the inspection plan data store 120 be co-located and/or may comprise a single apparatus.

In some cases, the autonomous inspection "robots" 130 may fly themselves and/or be wirelessly controlled via the industrial asset inspection platform 150 (e.g., by a human monitor using the remote device 160). As used herein, the term "robot" might refer to a machine (e.g., an electro-mechanical apparatus) capable of carrying out a set of tasks (e.g., movement of all or part of the machine, operation of one or more type of sensors 135 to acquire sensed data or measurements, and so forth) automatically (e.g., at least partially without input, oversight, or control by a user), such as a set of tasks programmed by a computer. Note that an autonomous inspection robot 130 may include one or more sensors 135 to detect one or more characteristics of an industrial asset. The autonomous inspection robot 130 may also include a processing system that includes one or more processors operatively coupled to memory and storage components.

According to some embodiments, the system 100 may automatically provide a human monitor with situational awareness during an inspection process via interactive user interface displays. For example, at (1) the industrial asset inspection platform 150 may access information in the three-dimensional model data store 110. Further information about industrial asset models is provided in connection with FIG. 3. At (2), the industrial asset inspection platform 150 may access information in the inspection plan data store 120. Further information about inspection plans is provided in connection with FIG. 4. At (3), the industrial asset inspection platform 150 may exchange information with one or more autonomous inspection robots 130. For example, the industrial asset inspection platform 140 might provide model and/or inspection plan data to the robots 130 (at which point the robots 130 can begin to fly themselves through an inspection process) and/or receive information gathered by the sensors 135 from the robots 130 (as the robots 130 perform the inspection process).

At (4), the industrial asset inspection platform 150 may provide a user interface 155 to a human monitor at a remote human monitor device 160. For example, the user interface 155 might display a current position of the robots 130 in relation to the industrial asset and/or the surround environment. According to some embodiments, the user interface 155 also provides a predicted flight path, sensor 135 operation, etc. for each robot 130 for an upcoming pre-determined time window (e.g., for the next thirty seconds, the next two minutes, etc.). The human monitor can the review the user interface 155 for mission critical and/or safety critical issues. Further information about the user interface 155 is provided in connection with FIG. 5. If necessary, the human monitor can also use the user interface 155 to change the operation of the robots 130 at (5). For example, the human monitor might instruct the robots 130 to "pause" the inspection process because of a predicted dangerous situation (e.g., it appears that two of the robots 130 will fly too close to each other in the near future).

Figure 2:
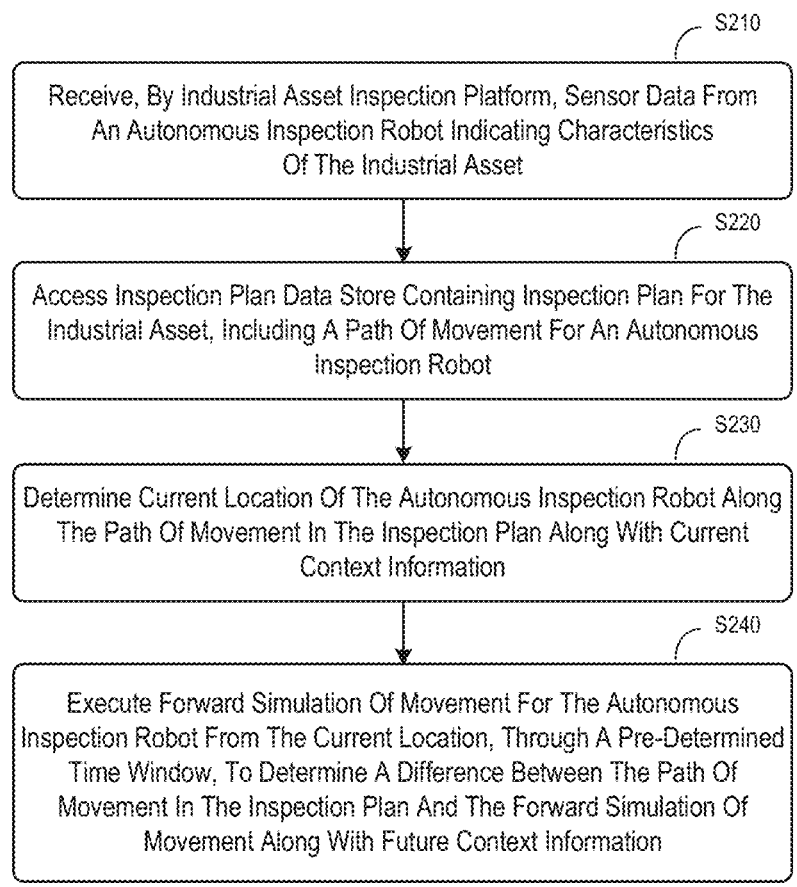
FIG. 2 illustrates an asset inspection method that might be performed according to some embodiments.

Thus, some embodiments may automatically provide a human monitor with situational awareness during an inspection process in an automated, efficient, and accurate manner. Note that the system 100 of FIG. 1 is provided only as an example, and embodiments may be associated with additional elements or components. According to some embodiments, the elements of the system 100 automatically support interactive user interface displays over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a computer processor of an industrial asset inspection platform may receive sensor data from an autonomous inspection robot (e.g., a drone, a wheeled vehicle, a vehicle adapted to travel along a track, a climbing vehicle, etc.) indicating one or more characteristics of an industrial asset (e.g., a flare stack, a wind turbine, a power grid, an aircraft, a locomotive, a pipe, a storage tank, a dam, etc.). Note that an autonomous inspection robot may include at least one sensor to collect the sensor data. According to some embodiments, a sensor might be associated with, for example, a camera (e.g., a Red-Green-Blue ("RGB") camera), a video camera, an Infra-Red ("IR") camera, a microphone, a chemical detector, a Light Detection and Ranging ("LIDAR") sensor, a radiation detector, etc. Note that the industrial asset inspection platform might also receive, in addition to sensor data, other information, such as planned objectives, Global Positioning System ("GPS")/Differential GPS ("DGPS") coordinates, altitude information, proximity information (e.g., how close the robot is to the asset or to a geo-fence or boundary), battery information (e.g., indicating a current amount of power), mission critical information, safety critical information, etc.

At S220, an inspection plan data store containing electronic records (comprising an inspection plan for the industrial asset) may be accessed. The inspection plan might include, for example, a path of movement for an autonomous inspection robot. According to some embodiments, an inspection plan may be associated with a plurality of autonomous inspection robots simultaneously collecting information. Note that an inspection plan might further include, in addition to the path of movement, other information, such as a sensor type associated with a point of interest (e.g., whether an RGB or IR camera should be used to collect data at a particular location), an anomaly associated with a point of interest (e.g., whether the robot is looking for corrosion or a crack at a particular location), a perspective associated with a point of interest 9 (e.g., a camera angle), an amount of time associated with a point of interest (e.g., that a robot should collect ten seconds of video at a particular location), etc. According to some embodiments, the inspection plan includes information about prior inspections of the industrial asset (e.g., historical flight paths or results obtained during prior inspections).

At S230, a current location of the autonomous inspection robot may be determined along the path of movement in the inspection plan along with current context information. For example, the robot might report the current location (e.g., via GPS/DGPS coordinates, altitude data, etc.) or an industrial asset inspection platform might be monitoring the location of a robot (e.g., via a camera located at ground level, a camera mounted on the industrial asset, etc.). At S240, a forward simulation of movement may be executed for the autonomous inspection robot from the current location, through a pre-determined time window, to determine a difference between the path of movement in the inspection plan and the forward simulation of movement along with future context information. The time window might represent a fixed period of time (e.g., the next ten seconds) or might be dynamically adjusted based on other factors (e.g., to include the next 100 meters of travel or the next five points of interest). As used herein, the phrases current or future "context information" might refer to any data needed to determine inspection context, including, for example, a sensor projection onto the three-dimensional model of the industrial asset (e.g., to determine whether the sensor is targeting the appropriate point of interest as described with respect to FIG. 8), an estimated remaining battery life, an estimated time of arrival at a point of interest, a data link strength, storage media operational status (e.g., indicating if sensor data is being properly recorded), a number of available satellites, a strength of a DGPS base station link, etc. In some embodiments, the system may automatically generate and transmit an alarm to a human monitor based on at least one of the current context information and the future context information. In this way, the human monitor may take preventive and/or corrective action as appropriate (e.g., by pausing the inspection).

According to some embodiments, a three-dimensional model data store containing electronic records (comprising a three-dimensional model of the industrial asset) may be accessed. The three-dimensional model might include, for example, a plurality of points of interest associated with the industrial asset. According to some embodiments, the three-dimensional model of the industrial asset includes information about the environment surrounding the industrial asset (e.g., including building data, other nearby industrial assets, other robots, humans moving through the area, trees, etc.). According to some embodiments, the three-dimensional model includes information about prior inspections of the industrial asset (e.g., based on sensor data gathered during prior inspections).

According to some embodiments, the system may also visually provide results of the forward simulation to a human inspection monitor via an interactive display along with the sensor data, indications of the points of interest, and a representation of the three-dimensional model. As a result, the amount of data presented to the human monitor may be limited allowing him or her to better process and respond to the information. According to some embodiments, the interactive display can be utilized by the inspection monitor to pause inspection, resume inspection, abort inspection, adjust the path of movement, pilot the inspection robot, etc. In this way, the human monitor can effectively respond to the current situation and avoid mission critical (e.g., preventing effective data gathering) or safety critical (e.g., resulting in asset damage or injury) failures. Although some embodiments are directed to systems in which a human operator monitors the current inspection situation, note that embodiments might also be associated with systems in which machine intelligence monitors the current inspection situation. For example, a software module or standalone monitoring apparatus equipped with artificial intelligence might similarly benefit from the focused and enhanced quality of information that may be available using a forward simulation, points of interest, and/or a representation of an industrial asset three-dimensional model.

Figure 3:
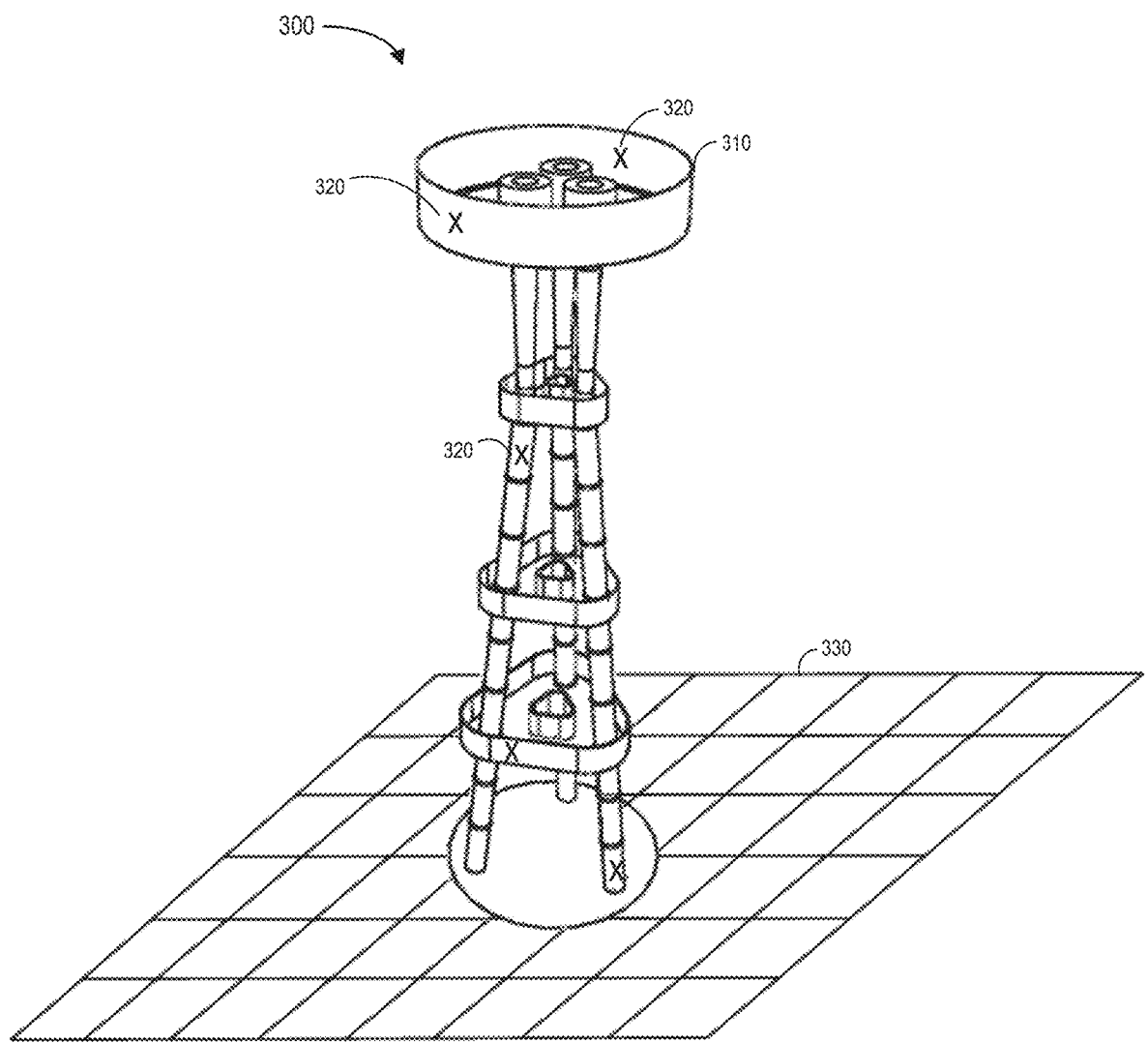
FIG. 3 illustrates a three-dimensional flare stack model in accordance with some embodiments.

FIG. 3 illustrates 300 a three-dimensional flare stack model 310 in accordance with some embodiments. The flare stack model 310 may include, for example, points of interest 320 (e.g., also designated with an "X" herein representing an area where a robot should collect sensor data) and/or information about the environment 330 surrounding the flare stack 310 (e.g., the nearby terrain, objects located near the asset 310, etc.).

According to some embodiments, the model 310 might be generated, maintained, and/or updated as a digital representation of the asset based on one or more characteristics that may be monitored using robot intermediaries and/or derived from known operating specifications. For example, the system may create a digital representation that includes, among other aspects, a structural model 310 of the asset (which may include separately modeling components of the asset as well as the asset as a whole). Such a structural model 310 may include material data for one or more components, lifespan and/or workload data derived from specifications and/or sensor data, and so forth. The digital representation, in some implementations, may also include operational or functional models of the asset, such as flow models, pressure models, temperature models, acoustic models, and so forth. Further, the digital representation may incorporate or separately model 310 environmental factors relevant to the asset, such as environmental temperature, humidity, pressure (such as in the context of a submersible asset, airborne asset, or space-based asset). As part of maintaining and updating the digital representation, one or more defects in the asset as a whole or components of the asset may also be modeled based on sensor data communicated to the processing components.

Depending on the characteristics of the structural model, the system may generate a plan specifying one or more tasks or action, such as acquiring additional data related to the asset. For example, if the system determines that acquired data of a location on the structural model 310 is below a threshold quality or is otherwise insufficient, the system may generate or update a revised plan that includes one or more tasks that position the robot to acquire additional data regarding the location.

The sensor data used to generate, maintain, and update the digital representation, including modeling of defects, may be derived from sensor data collected using one or more of sensors mounted on robots controlled by the processing components and/or by sensors integral to the asset itself which communicate their sensor data to the processing components. As used herein, the robots used to collect sensor data may be autonomous and capable of movement and orientation in one- (such as along a track), two-(such as along connected roads or along a generally planar surface), or three dimensions (such as three-dimensional movement within a body of water, air, or space). The sensors used to collect the sensor data may vary between robots and/or may be interchangeable allowing for customization of robots depending on need. Example of sensors include, but are not limited to, cameras or visual sensors capable of imaging in one or more of visible, low-light, ultraviolet, and or infrared (i.e., thermal) contexts, thermistors or other temperature sensors, material and electrical sensors, pressure sensors, acoustic sensors, radiation sensors or imagers, probes that apply non-destructive testing technology, and so forth. With respect to probes, for example, the robot may contact or interact physically with the asset to acquire data.

The digital representation may incorporate or be updated based on a combination of factors detected from one or more sensors on the robot (or integral to the asset itself). For instance, the system may receive visual image data from image sensors (e.g., cameras) on the robots to create or update a model 310 of the asset to localize defects on the model. Based on the sensor data, as incorporated into the model, the processor may detect a defect, such as a crack, a region of corrosion, or missing part, of the asset. For example, the system may detect a crack on a location of a vehicle based on visual image data that includes color and/or depth information indicative of the crack. The model 310 may additionally be used as a basis for modeling other layers of information related to the asset. Further, the system may determine risk associated with a potential or imminent defect based on the digital representation.

Figure 4:
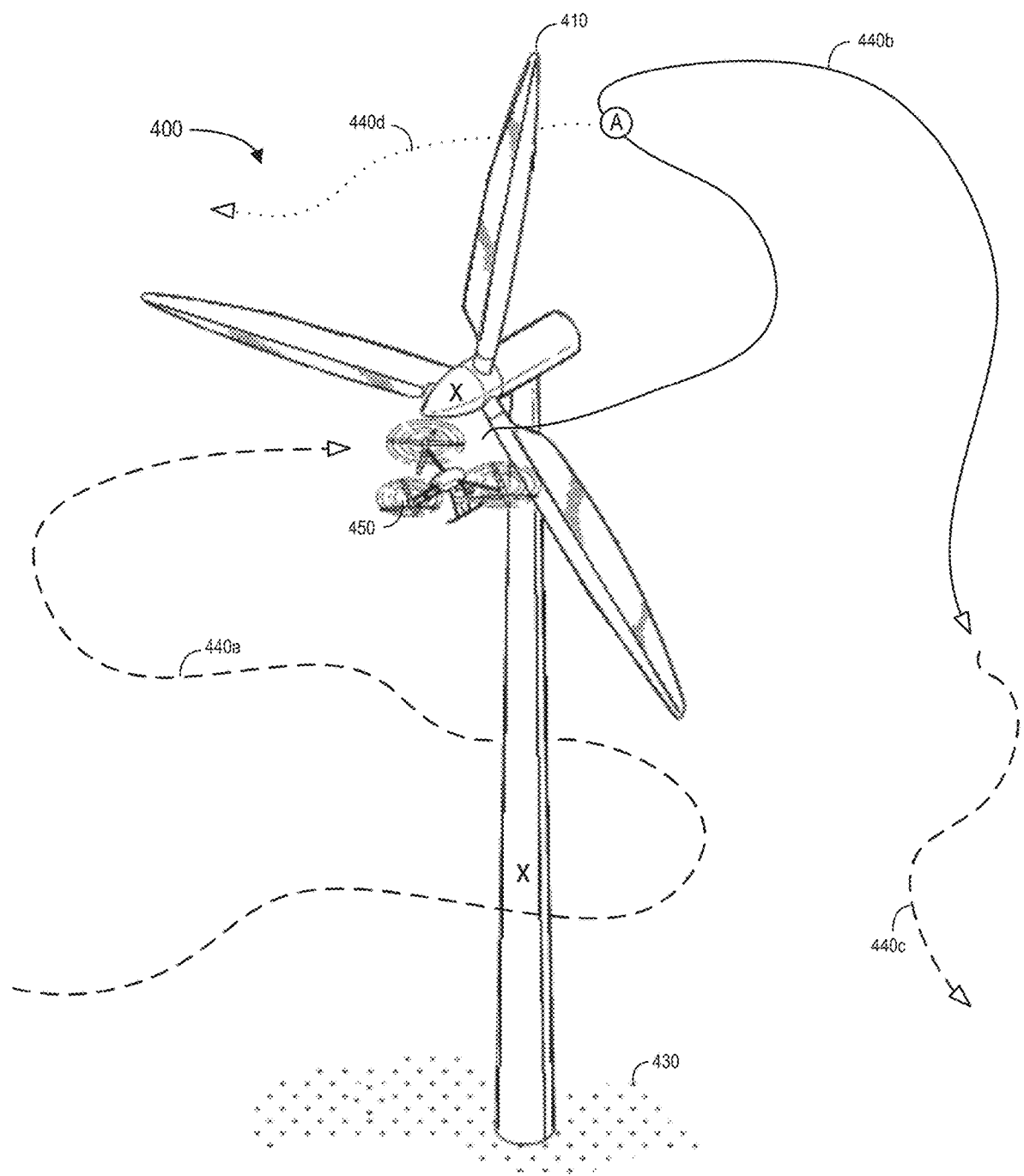
FIG. 4 is an example of an inspection plan for a wind turbine according to some embodiments.

FIG. 4 is an example 400 of an inspection plan for a wind turbine 410 and/or the environment 430 surrounding the wind turbine 410 according to some embodiments. In particular, the inspection plan includes a path of movement 440 for an autonomous inspection robot 450. For example, the path of movement 440 might take the robot 450 past various points of interest (e.g., on the tower of the wind turbine 410, at the blades or rotor of the wind turbine 410, at the nose cone or hub of the wind turbine 410, etc. as designated with "X" in FIG. 4). Assuming the that robot 450 is currently located near the nose cone or hub of the wind turbine 410 (as illustrated in FIG. 4), the path or movement 440 might include: (1) a past path of movement 440a (represented by a dashed line in FIG. 4) indicated where the robot 450 as already traveled; (2) results of a forward simulation 440b (represented by a solid line in FIG. 4) from the current location of the robot 450 through a pre-determined time window; and (3) a predicted path of movement 440c (represented by a dashed line in FIG. 4) after that time window. Note that only portion 440b might be displayed to a human monitor via a user interface. This will limit the information that needs to be processed by the human monitor to only the most important data, thereby improving his or her situational awareness.

Note that the path of movement 440 might be associated with a single path moving near the wind turbine 410. In other embodiments, however, the robot 450 might dynamically make decisions along the path that could potentially result in different path branches being taken. For example, at point (A) in FIG. 4 the robot 450 might continue along the results of the forward simulation 440b or, in the alternative, instead take a conditional branch path 440d (represented by a dotted line in FIG. 4). This might depend, for example, one characteristics of sensor data collected during the inspection process (e.g., the robot 450 might return to a previous point of interest to collect more information). Executing a forward simulation, and displaying to a human operator the results of that execution, will further reduce the amount of information that needs to be processed (e.g., associated with conditional branch paths that are not likely to be taken) and improve his or her situational awareness.

Thus, the system may be configured to generate a plan to assess the asset for defects. For example, the system may determine a plan based on the tasks (e.g., desired inspection coverage of the asset) and/or resources (e.g., robots) available. Based on the generated plan system may implement the plan by sending signal(s) to the robots providing instructions to perform the tasks defined in the plan. A controller of each robot may process any received instructions and in turn send signal(s) to one or more effectors controlled by the respective robot to control operation of the robot to perform the assigned tasks.

The system may determine a plan to monitor the asset. The plan may include one or more tasks to be performed by one or more robots of the robotic system. Further, the system may adjust (e.g., revise) the plan based on the data received from the sensors related to the asset. For example, the plan may be adjusted based on acquired data indicative of a potential defect of the asset. The system may send a signal(s) encoding or conveying instructions to travel a specified distance and/or direction that enables the robot to acquire additional data related to the asset associated with the potential defect.

Upon performing the assigned tasks, the system may assess the quality of data received from the sensors. Due to a variety of factors, the quality of the data may be below a threshold level of quality. For example, pressure sensors or acoustic sensors may have background noise due to the conditions proximate to the asset. As such, the system may determine a signal-to-noise ratio of the signals from the sensors that indicates a relationship between a desired signal and background noise. If the system determines that the signal to-noise ratio falls below a threshold level of quality, the system may adapt the plan to acquire additional data.

Note that inspections of industrial assets using robotic systems may introduce of safety concerns (e.g., worries that a robotic system might harm an industrial asset, other robotic systems, or even nearby personnel). Current inspection techniques may utilize tele-operation such that a human operator drives decision related to robotic navigation/flight, data collection, and ensures that the robot operates safely. In other approaches, a robot may perform inspection autonomously while critical safety decisions are still based on visual observations and judgements of a human monitor. Further note that safety critical decisions based on visual observations might not be appropriate in some cases (e.g., when operating robots within highly hazardous and/or cluttered environments). Embodiments described herein may provide improved information to a human monitor about robots, objectives, intentions, etc. during the inspection process. This may let the human operator proactively intervene to avoid safety issues.

Figure 5:
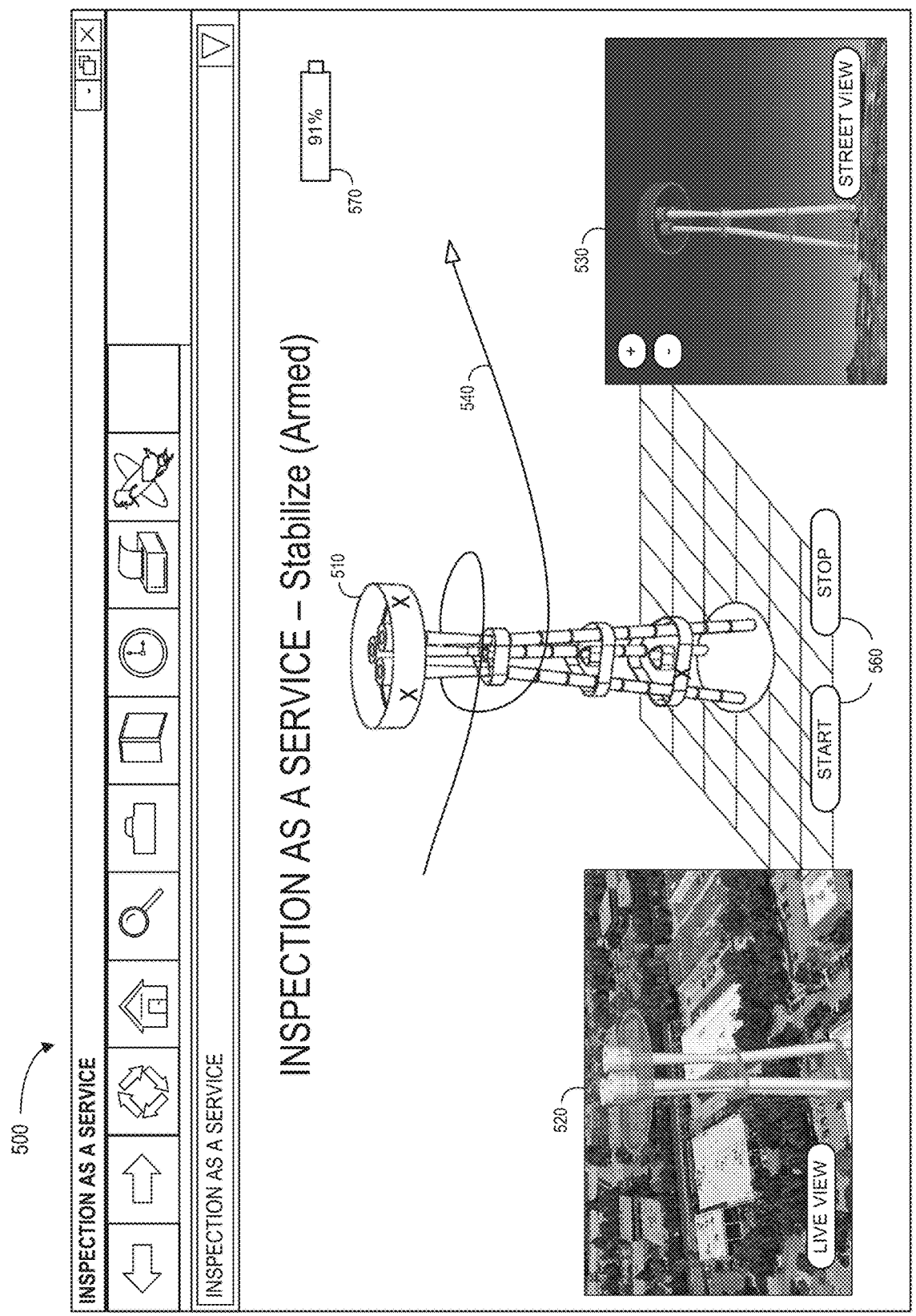
FIG. 5 is an interactive user interface display in accordance with some embodiments.

For example, FIG. 5 is an interactive user interface display 500 in accordance with some embodiments. The display 500 might be associated with an inspection as a service process and include a representation of an industrial asset model 510, points of interest ("X"), the nearby environment, etc. According to some embodiments, the display 500 further includes results 540 of a forward simulation of robot operation from a current location though a pre-determined time window (e.g., the next thirty seconds). By removing extraneous data (e.g., past movement of the robot, conditional branch paths that will not be taken by the robot, movements too far in the future, etc.), the results 540 improve the situational awareness of a human monitor interacting with the display 500. According to some embodiments, the display 500 includes additional information, such as a live view 520 of the area, a street view 530 of the industrial asset, battery power 570 of one or more autonomous inspection robots, etc. The display 500 might further include icons 560 that, when selected by a human monitor (e.g., via a computer mouse or touchscreen), alter the inspection process (e.g., by stopping the process, transferring control to the human monitor, etc.). In some cases, selection of an element on the display 500 might result in further information being provided about that element (e.g., in a "pop-up" window), adjust display parameters (e.g., by zooming a portion of the display 500 in or out), etc.

Thus, embodiments may provide an autonomous robotic system with an inspection plan. The inspection plan may include, for example, points of interest, anomalies to look for at each point of interest, a desired viewing perspective for each point of interest, etc. Based on the inspection needs, the robotics system generates a flight/motion plan around the asset that will be followed to collect inspection data as appropriate. The robotics system may also be provided with the three-dimensional model of the environment in which the inspection will be conducted. During the autonomous inspection execution, the robotic system may send information about planned objectives, namely the objectives that will be executed within the next few minutes/seconds, three-dimensional information about the operating environment, a live feed from a sensor (e.g., an RGB camera), GPS coordinates, and any other safety critical information to the monitor of the user interface. This information may then be projected on a three-dimensional model 510 of the display 500. The human monitor may then look at the information and make an assessment about whether the robot's intended actions within next few minutes/seconds are consistent with the original inspection objectives. If there is a mismatch, the human monitor can intervene as appropriate (e.g., by taking control of the robot).

Figure 6:
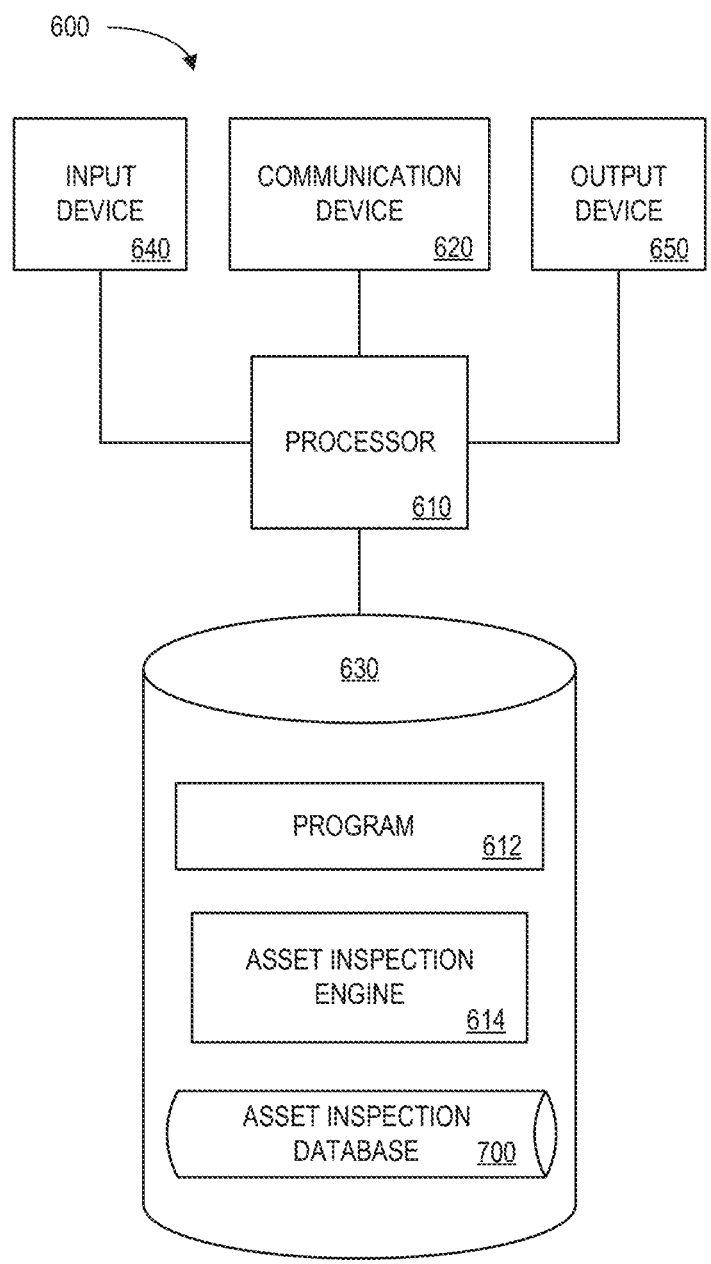
FIG. 6 illustrates a monitoring platform in accordance with some embodiments.

The embodiments described herein may be implemented using any number of different hardware configurations. For example, FIG. 6 is block diagram of an industrial asset inspection platform 600 that may be, for example, associated with the system 100 of FIG. 1. The industrial asset inspection platform 600 comprises a processor 610, such as one or more commercially available Central Processing Units ("CPUs") in the form of one-chip microprocessors, coupled to a communication device 620 configured to communicate via a communication network (not shown in FIG. 6). The communication device 620 may be used to communicate, for example, with one or more remote robots, human monitor devices, etc. The industrial asset inspection platform 600 further includes an input device 640 (e.g., a computer mouse and/or keyboard to input inspection information, asset modeling data, drone control signals, etc.) and/an output device 650 (e.g., a computer monitor to render a user interface display, transmit control signals to inspection robots, etc.). According to some embodiments, a mobile device and/or PC may be used to exchange information with the industrial asset inspection platform 600.

The processor 610 also communicates with a storage device 630. The storage device 630 may comprise any appropriate information storage device, including combinations of magnetic storage devices (e.g., a hard disk drive), optical storage devices, mobile telephones, and/or semiconductor memory devices. The storage device 630 stores a program 612 and/or an asset inspection engine 614 for controlling the processor 610. The processor 610 performs instructions of the programs 612, 614, and thereby operates in accordance with any of the embodiments described herein. For example, the processor 610 may access a three-dimensional model data store that contains a three-dimensional model of an industrial asset (including points of interest associated with the industrial asset). The processor 610 might also access an inspection plan data store that contains an inspection plan for the industrial asset (including a path of movement for an autonomous inspection robot). The processor 610 may receive sensor data from an autonomous inspection robot indicating characteristics of the industrial asset and determine a current location of the autonomous inspection robot along the path of movement in the inspection plan along with current context information. A forward simulation of movement for the autonomous inspection robot may be executed by the processor 610 from the current location, through a pre-determined time window, to determine a difference between the path of movement in the inspection plan and the forward simulation of movement along with future context information. According to some embodiments, the processor 610 may then visually provide results of said forward simulation to a human inspection monitor via an interactive display along with the sensor data, indications of the points of interest, and a representation of the three-dimensional model. According to other embodiments, the processor 610 may instead provide information about the forward simulation to a monitoring apparatus (e.g., associated with machine intelligence).

The programs 612, 614 may be stored in a compressed, uncompiled and/or encrypted format. The programs 612, 614 may furthermore include other program elements, such as an operating system, clipboard application, a database management system, and/or device drivers used by the processor 610 to interface with peripheral devices.

As used herein, information may be "received" by or "transmitted" to, for example: (i) the monitoring and control platform 600 from another device; or (ii) a software application or module within the industrial asset inspection platform 600 from another software application, module, or any other source.

In some embodiments (such as the one shown in FIG. 6), the storage device 630 further stores an asset inspection database 700. An example of a database that may be used in connection with the industrial asset inspection platform 600 will now be described in detail with respect to FIG. 7. Note that the database described herein is only one example, and additional and/or different information may be stored therein. Moreover, various databases might be split or combined in accordance with any of the embodiments described herein.

Figure 7:
FIG. 7 is a tabular portion of an asset inspection database according to some embodiments.

Referring to FIG. 7, a table is shown that represents the asset inspection database 700 that may be stored at the industrial asset inspection platform 600 according to some embodiments. The table may include, for example, entries identifying asset inspection processes that have been executed in accordance with any of the embodiments described herein. The table may also define fields 702, 704, 706, 708, 710, 712, 714 for each of the entries. The fields 702, 704, 706, 708, 710, 712, 714 may, according to some embodiments, specify: an asset inspection identifier 702, an asset identifier 704, three-dimensional model data 706, inspection plan data 708, results of forward simulation 710, collected sensor data 712, and a status 714. The asset inspection database 700 may be created and updated, for example, when an industrial asset is installed, inspections are performed, etc.

The asset inspection identifier 702 may be, for example, a unique alphanumeric code identifying an inspection process that was performed by an autonomous inspection robot under the supervision of a human monitor (and might include the date and/or time of the inspection). The asset identifier 704 might identify the industrial asset that was being inspected. The three-dimensional model data 706 (e.g., including Points of Interest ("POI") and the inspection plan data 708 might comprise the information that used to conduct the inspection. The results of forward simulation 710 might represent, for example, the path of an inspection robot for the next twenty seconds. The results of forward simulation 710 might represent data that is displayed to the human monitor for real-time review during the inspection processes. The collected sensor data 712 might include the pictures, videos, etc. used to record characteristics of the industrial asset being inspected. The status 714 might represent the current status of the inspection process (e.g., is the process currently halted because the human monitor noticed a potential anomaly in the results of forward simulation 710?).

Figure 8:
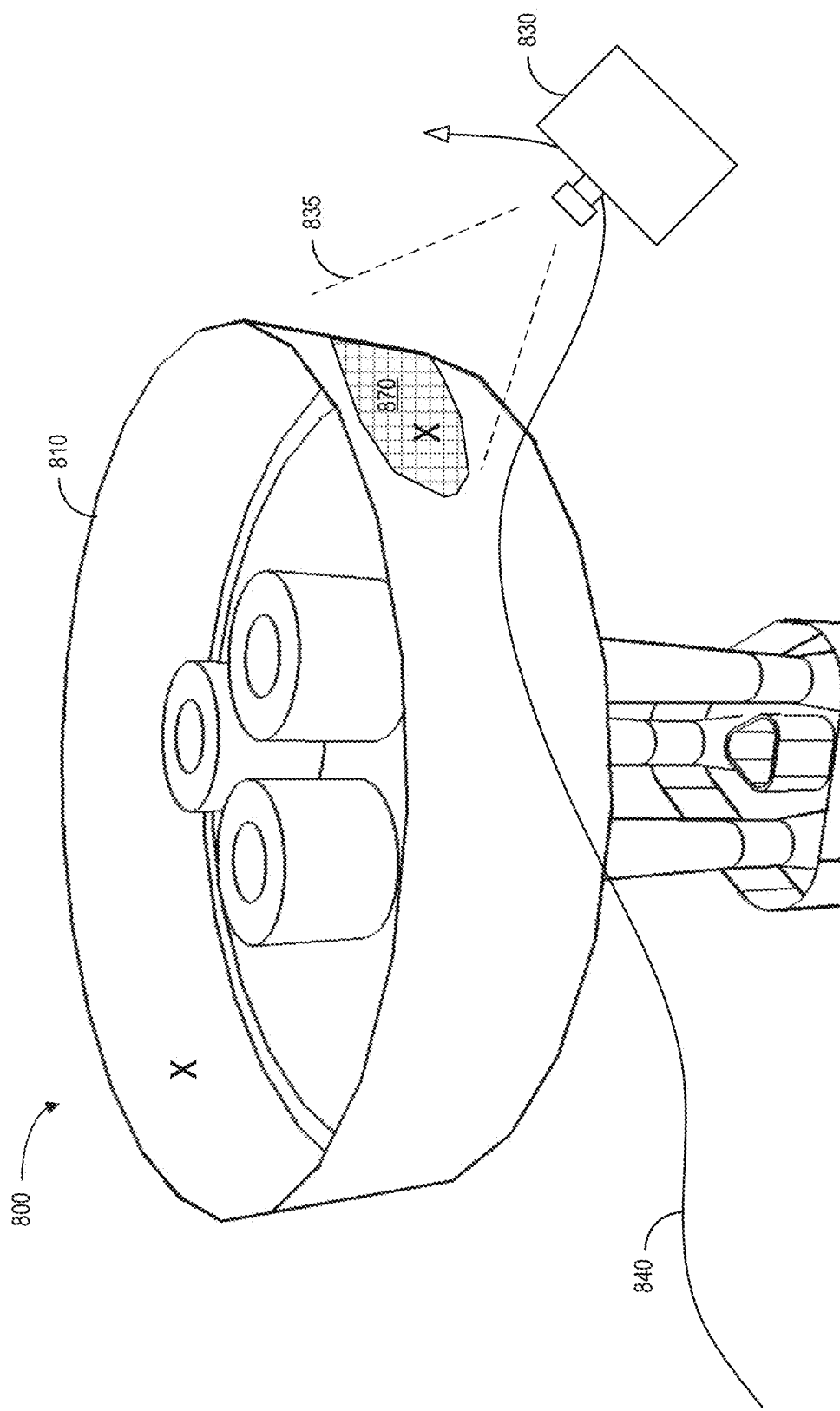
FIG. 8 is another example of an inspection plan for an industrial asset in accordance with some embodiments.

FIG. 8 is another example 800 of an inspection plan for an industrial asset/model 810 in accordance with some embodiments. As before, results of a forward simulation representing a path of movement 840 for an autonomous inspection robot 830 may be displayed to a human monitor along with indications of points of interest ("X"). According to this embodiment, an orientation of the autonomous inspection robot 830 may also be displayed along with a field of view 835 of a sensor on that robot 830. Such an approach might, for example, let a human monitor ensure that a point of interest is going to be within the field of view 835. According to some embodiments, a "sensed area of collection" 870 may also be projected onto a surface of the industrial asset model 810 (as indicated by the cross-hatched area in FIG. 8). This may further improve the situational awareness of the human operator.

Thus, some embodiments may provide systems and methods to facilitate situational awareness for an autonomous asset inspection robot monitor accurately and efficiently. This may reduce both mission critical and safety critical problems during an inspection process. In particular, a robotics system performs a forward simulation of its actions against planned actions. A human monitor is informed of this information on a user interface to let the monitor proactively take remedial action as appropriate.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 9:
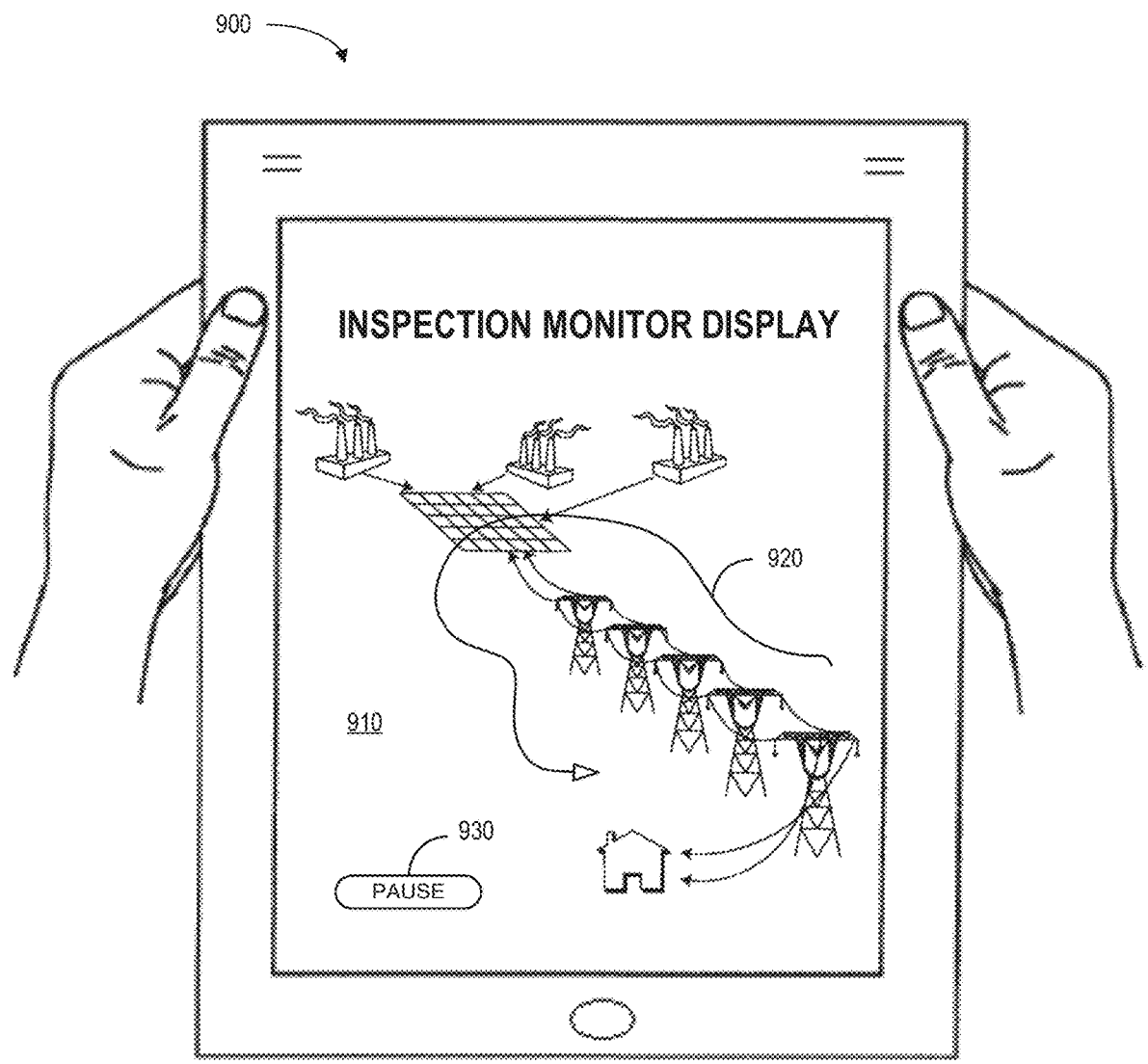
FIG. 9 illustrates a tablet computer displaying an interactive graphical user interface according to some embodiments.

Although specific hardware and data configurations have been described herein, note that any number of other configurations may be provided in accordance with embodiments of the present invention (e.g., some of the information associated with the databases described herein may be combined or stored in external systems). Moreover, although some embodiments are focused on certain types of industrial asset damage or inspection, any of the embodiments described herein could be applied to other situations, including cyber-attacks, weather damage, etc. Moreover, the displays described herein are used only as examples, and any number of other types of displays could be used. For example, FIG. 9 illustrates a tablet computer 900 displaying an interactive graphical user interface 910 according to some embodiments. In particular, the display 910 includes results of a forward simulation for an autonomous inspection robot proximate to an industrial asset (e.g., elements of a power grid). Moreover, the touchscreen of the tablet 900 may be used to select icons 930 that control the asset inspection process (e.g., to let a human monitor viewing the display 910 avoid upcoming problems).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system for inspecting an industrial asset, comprising:
a three-dimensional (3D) model data store comprising a 3D model of the industrial asset, the 3D model including a plurality of points of interest associated with the industrial asset;
an inspection plan data store comprising an inspection plan for inspecting the industrial asset, the inspection plan including a path of movement for execution by an autonomous inspection robot; and
an industrial asset inspection platform communicatively coupled to the 3D model data store and the inspection plan data store, wherein the industrial asset inspection platform includes at least one processor operatively coupled to at least one memory, wherein the at least one processor is configured to:
receive sensor data from the autonomous inspection robot indicative of one or more characteristics of the industrial asset;
determine a current location of the autonomous inspection robot along the path of movement of the inspection plan;
execute and update a forward simulation of movement for the autonomous inspection robot from the current location of the autonomous inspection robot to generate a predicted path of movement of the autonomous inspection robot that extends from the current location over a duration of a pre-determined time window; and
overlay, via an interactive display, the predicted path of movement onto a representation of the 3D model in real-time, wherein the interactive display is configured to receive a user input and to transmit the user input to the at least one processor to cause the at least one processor to adjust the path of movement of the autonomous inspection robot.

2. The system of claim 1, wherein the at least one processor is further configured to determine current context information including at least one of a sensor projection onto the 3D model of the industrial asset, an estimated remaining battery life, an estimated time of arrival at a point of interest, a data link strength, a storage media operational status, a number of available satellites, and a strength of a Differential Global Positioning System ("DGPS") base station link.

3. The system of claim 2, wherein the at least one processor of the industrial asset inspection platform is further configured to automatically display an alarm via the interactive display based on the current context information.

4. The system of claim 1, comprising the autonomous inspection robot, wherein the autonomous inspection robot includes at least one sensor configured to collect the sensor data.

5. The system of claim 4, wherein the autonomous inspection robot is a drone.

6. The system of claim 4, wherein the at least one sensor includes at least one of a camera, a video camera, an infra-red camera, a microphone, a chemical detector, a Light Detection and Ranging ("LIDAR") sensor, and a radiation detector.

7. The system of claim 4, wherein the inspection plan data store comprises inspection plans for a plurality of autonomous inspection robots configured to acquire additional sensor data indicative of the one or more characteristics of the asset.

8. The system of claim 1, wherein the interactive display is configured to receive the user input and to transmit the user input to the at least one processor to cause the at least one processor to pause inspection operations of the industrial asset, resume inspection operations of the industrial asset, or abort inspection operations of the industrial asset.

9. The system of claim 1, wherein the inspection plan includes instructions specifying a type of sensor, of the autonomous inspection robot, to be used for acquisition of data at a particular point of interest of the plurality of points of interest.

10. The system of claim 1, wherein the inspection plan data store includes information indicative of an environment surrounding the industrial asset.

11. The system of claim 1, wherein the inspection plan data store includes information indicative of prior inspections of the industrial asset.

12. The system of claim 1, wherein the predicted path of movement is indicative of a first portion of the path of movement, wherein a second portion of the path of movement includes a past path of movement previously traveled by the autonomous inspection robot to arrive at the current location, and wherein a third portion of the path of movement includes a future path of movement to be traveled by the autonomous inspection robot subsequent to completion of the predicted path of movement.

13. The system of claim 1, wherein the at least one processor is further configured to overlay indications of the plurality of points of interest onto the representation of the 3D model.

14. The system of claim 13, wherein the at least one processor is further configured to display, via the interactive display, the sensor data indicating the one or more characteristics of the industrial asset.

15. The system of claim 1, wherein the at least one processor is further configured to determine whether a sensor of the autonomous inspection robot is targeting one of the plurality of points of interest on the industrial asset by performing a sensor projection onto the 3D model of the industrial asset.

16. The system of claim 1, wherein the interactive display is configured to receive the user input and to transmit the user input to the at least one processor to enable user-controlled piloting of the autonomous inspection robot via the interactive display.

17. The system of claim 1, wherein the inspection plan includes instructions specifying an acquisition time during which the autonomous inspection robot is to collect data at a particular point of interest of the plurality of points of interest.

18. A method for inspecting an industrial asset, comprising:
receiving, at a processor of an industrial asset inspection platform, sensor data from a sensor of an autonomous inspection robot indicative of one or more characteristics of the industrial asset;
identifying, in an inspection plan data store, an inspection plan for inspecting the industrial asset, the inspection plan including a path of movement for the autonomous inspection robot;
determining a current location of the autonomous inspection robot along the path of movement of the inspection plan;
executing and updating a forward simulation of movement for the autonomous inspection robot from the current location of the autonomous inspection robot to generate a predicted path of movement of the autonomous inspection robot that extends from the current location over a duration of a pre-determined time window;
acquiring, from a three-dimensional (3D) model data store, a 3D model of the industrial asset, the 3D model including a plurality of points of interest associated with the industrial asset; and
overlaying, via an interactive display, the predicted path of movement of the autonomous inspection robot, from the current location of the onto a representation of the 3D model in real-time, wherein the interactive display is configured to receive a user input and to transmit the user input to the processor to cause the processor to adjust the path of movement of the autonomous inspection robot.

19. The method of claim 18, further comprising determining current context information during inspection of the asset, wherein the current context information includes at least one of a sensor projection onto the three-dimensional model of the industrial asset, an estimated remaining battery life, an estimated time of arrival at a point of interest, a data link strength, a storage media operational status, a number of available satellites, and a strength of a Differential Global Positioning System ("DGPS") base station link.

20. The method of claim 18, wherein the autonomous inspection robot is a drone, a wheeled vehicle, a vehicle adapted to travel along a track, or a climbing vehicle.

21. The method of claim 18, wherein the sensor is a camera, a video camera, an infra-red camera, a microphone, a chemical detector, a Light Detection and Ranging ("LIDAR") sensor, or a radiation detector.

22. A non-transitory, computer-readable medium storing program code, wherein the program code, when executed by a processor of an industrial asset inspection platform, causes the industrial asset inspection platform to perform operations comprising:
receiving, at the processor, sensor data from at least one sensor of an autonomous inspection robot indicating one or more characteristics of the industrial asset;
identifying, in an inspection plan data store, an inspection plan for inspecting the industrial asset, the inspection plan including a path of movement for the autonomous inspection robot;
determining a current location of the autonomous inspection robot along the path of movement of the inspection plan;
executing and updating a forward simulation of movement for the autonomous inspection robot from the current location of the autonomous inspection robot to generate a predicted path of movement of the autonomous inspection robot that extends from the current location over a duration of a pre-determined time window;

acquiring, from a three-dimensional (3D) model data store, a 3D model of the industrial asset, the 3D model including a plurality of points of interest associated with the industrial asset; and overlaying, via an interactive display, the predicted path of movement of the autonomous inspection robot onto a representation of the 3D model in real-time, wherein the interactive display is configured to receive a user input and to transmit the user input to the processor to cause the processor to adjust the path of movement of the autonomous inspection robot.

23. The non-transitory, computer-readable medium of claim 22, wherein the program code, when executed by the processor, causes the industrial asset inspection platform to further perform operations comprising generating an alarm based on results of a sensor projection onto the 3D model of the industrial asset.

24. The non-transitory, computer-readable medium of claim 22, wherein the program code, when executed by the processor, causes the industrial asset inspection platform to further perform operations comprising, in response to receiving the user input at the interactive display: pausing inspection of the industrial asset, resuming inspection of the industrial asset, aborting inspection of the industrial asset, or adjusting the path of movement of the autonomous inspection robot.

25. The non-transitory, computer-readable medium of claim 22, wherein the inspection plan further includes instructions specifying a sensor type to be used for acquisition of the sensor data at a particular point of interest of the plurality of points of interest.

* * * * *